United States Patent Office 2,740,258
Patented Apr. 3, 1956

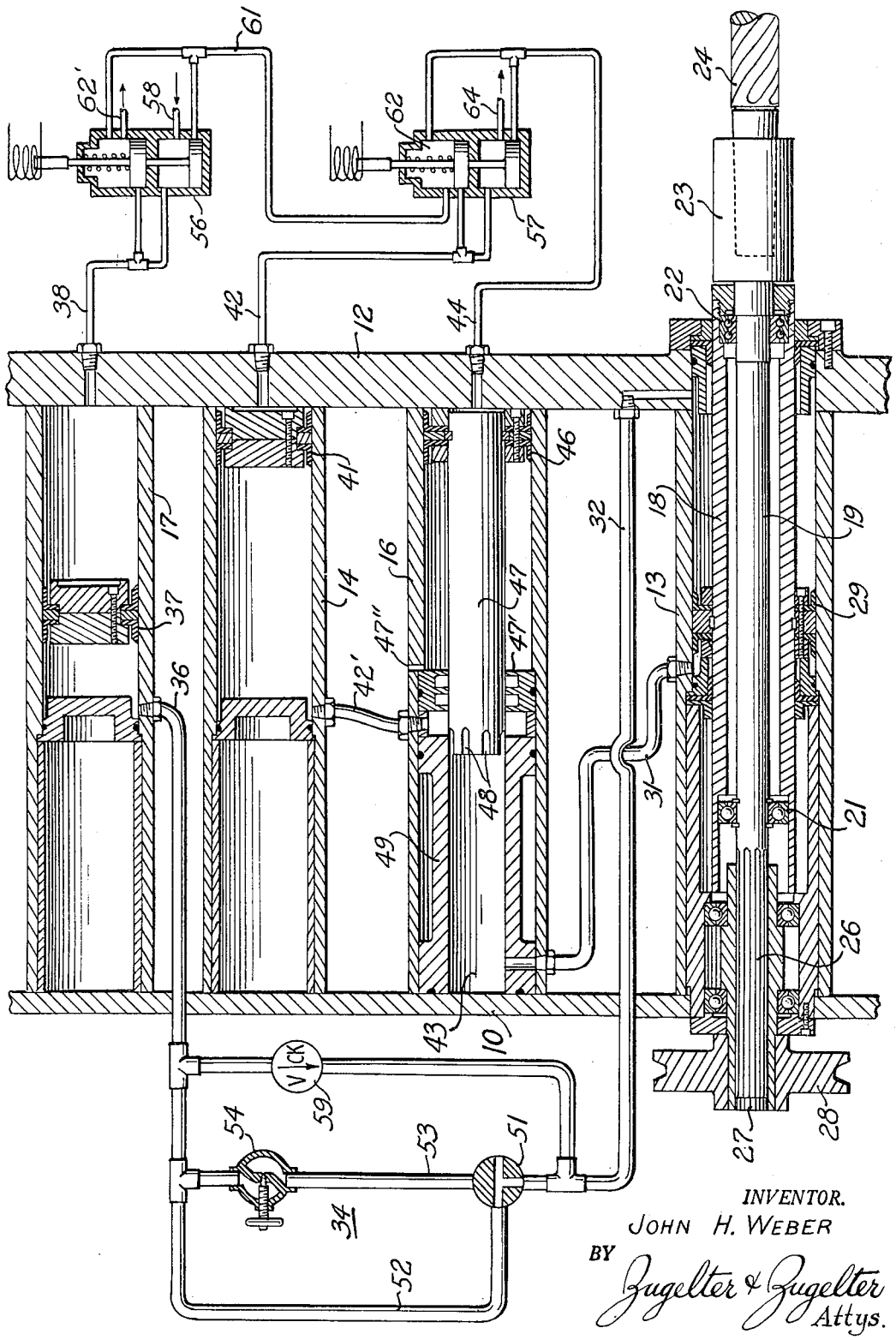

2,740,258

QUILL ADVANCING AND RETRACTING DEVICE

John H. Weber, Reily, Ohio, assignor to The Morris Machine Tool Company, Cincinnati, Ohio, a corporation of Ohio Application December 6, 1952, Serial No. 324,568

1 Claim. (Cl. 60—54.5)

This invention relates to a machine tool having a rotating and reciprocating tool member. More particularly, this invention relates to a device for advancing and retracting the quill of a machine tool.

An object of this invention is to provide a pneumatically powered device for advancing a tool to a work piece at a rapid rate and then feeding the tool through the work at a reduced speed.

A further object of this invention is to provide a device of this type in which hydraulic fluid is used for transmitting pressure from a pneumatic power source.

A further object of this invention is to provide a device of this type in which pneumatic pressure actuates pistons in a series of cylinders to actuate hydraulic driving mechanism for advancing and retracting a quill.

A further object of this invention is to provide a device in which a single source of air under pressure is used for powering quick advance, tool feed, and tool return.

A further object of this invention is to provide a quill-advancing and retracting device actuated by hydraulic pressure developed by a plurality of cylinders in each of which is a piston actuated by air pressure and displacing liquid.

A further object of this invention is to provide a quill advancing and retracting device of this type controlled whereby there is high speed advance of the quill to the work, a slowdown of the quill as the tool is fed through the work, a control of the rate of feed, and a quick return of the quill.

A further object of this invention is to provide a device of this type in which the pressure on the quill is boosted during the feed stroke.

The above and other objects and features of the invention will in part be apparent and will in part be obvious from the following detailed description, and the drawing which is a developed view of a drilling machine constructed in accordance with an embodiment of this invention, the valves of the machine being shown schematically.

In the following detailed description, and the drawing, like reference characters indicate like parts:

In the drawing, end plates of the head of a drilling machine or drill press are indicated at 10 and 12, respectively. The end plates 10 and 12 are held in position by an appropriate casing, not shown. The plates 10 and 12 support a main or quill-supporting cylinder 13, a quick advance cylinder 14, a feed cylinder 16 and a return cylinder 17. The main cylinder 13 surrounds a quill 18 which can be advanced to the right or left within the cylinder 13. A spindle 19 is rotatably mounted in said quill 18 and supported by bearings 21 and 22 inside the quill. The spindle 19 is attached to a chuck member 23, in which an appropriate drill 24 or the like may be mounted. As the drill 24 and quill 18 are advanced to the right or left, as shown in the drawing, a splined end 26 of the spindle advances inside a splined sleeve 27. Splined sleeve 27 is rotatably mounted in cylinder 13 and carries a pulley 28. Pulley 28 may be driven by an appropriate power source (not shown) to turn the spindle and tool.

Quill 18 is keyed to a piston 29 which reciprocates inside cylinder 13. Hydraulic fluid under pressure is introduced into cylinder 13 at the left of piston 29 through a conduit 31 to advance the quill and drill. During advance of the drill, hydraulic fluid is discharged from the right hand end of cylinder 13 through a conduit 32. The fluid discharged through conduit 32 passes through flow control apparatus 34 (to be described in detail hereafter) to a conduit 36. Conduit 36 discharges into the return cylinder 17. Fluid discharged by conduit 36 is received in cylinder 17 on the left hand side of a piston 37 therein to drive piston 37 to the right as the quill is advanced to the right. When the quill is to be returned to the left to its initial or released position, compressed air introduced into the right hand end of cylinder 17 through a line 38 to drive piston 37 to the left, returning the hydraulic fluid through conduits 36 and 32 into the right hand end of cylinder 13.

The power required for advancing the tool to the right from its initial or released position, as shown in the drawing, is supplied by cylinders 14 and 16. Cylinder 14 supplies power for quick advance of the quill from its released position to adjacent a work piece (not shown). Cylinder 16 supplies power for feeding the tool through the work piece.

Cylinder 14 contains a piston 41. Air under pressure is introduced through an air line 42 into the right hand end of cylinder 14 to drive piston 41 to the left during quick advance of the tool. Hydraulic fluid on the left of piston 41 is discharged through a conduit 42' into cylinder 16. The fluid flows through a cavity 43 in cylinder 16 and from cavity 43 through conduit 31 to cylinder 13 to cause quick advance of the quill 18.

When the piston 41 has been advanced sufficiently to cause the tool to advance substantially to a work piece (not shown), air under pressure is introduced through a line 44 into the right hand end of cylinder 16. The air drives the piston 46 to the left, as shown in the drawing. As shown, piston 46 is attached to a plunger 47. The plunger 47 passes through a fluid seal 47'. The space between piston 46 and seal 47' is vented, as indicated at 47". The left hand end of the plunger 47 is fluted as indicated at 48, so that when piston 46 and plunger 47 are in the position shown in the drawing, the flutes permit passage of hydraulic fluid from line 42' into the cavity 43. However, as soon as plunger 47 is advanced a limited distance to the left, the flutes move inside a sleeve 49 and are closed, and during further advance of the plunger 47, hydraulic fluid from cavity 43 is forced into conduit 31 to cause feeding of the tool. During the operation of piston 46 and plunger 47, the quill and the tool are moved at a slower speed than during quick advance but under a greater pressure.

During the feed of the quill, sudden advance thereof is prevented by means of the flow control apparatus 34. Fluid from the right hand end of cylinder 13 passes through conduit 32 to a three-way valve 51. During quick approach, valve 51 is placed in the position shown in which conduit 32 communicates with a conduit 52. Conduit 52, in turn, communicates directly with conduit 36, so that, during quick approach, the fluid discharged from cylinder 13 flows directly through conduit 32, valve 51 and conduits 52 and 36 to cylinder 17. However, at the start of the feed of the tool through the work, valve 51 is turned to a position in which conduit 32 communicates with a conduit 53. Conduit 53 directs the fluid through a needle valve 54. Needle valve 54 is set at an appropriate opening to permit feed of the tool but to throttle any sudden advance thereof, so that when the tool breaks through a work piece, the quill and tool can not be advanced with a sudden increase in speed.

The supply of air under pressure to the various cylinders is controlled by means of solenoid operated valves 56 and 57. Compressed air is introduced into valve 56 through a line 58 from any appropriate source of compressed air. When the solenoid of valve 56 is de-energized, the air under pressure is directed through line 38 into return cylinder 17 to drive piston 37 to the left and to cause flow of fluid from cylinder 17 through line 36, a check valve 59, valve 51, and line 32, to the right hand end of cylinder 13. At the start of the quick approach three-way valve 51 is positioned as shown in the drawing, and the solenoid valves 56 and 57 are both energized. By the energizing of valve 56, air line 58 is connected through a line 61 to the upper chamber 62 of valve 57 and line 38 from return cylinder 17 is connected to an exhaust line 62'. By the energization of valve 57, the upper chamber 62 of valve 57 also is connected to line 42, so that air under pressure is directed into the right hand end of cylinder 14 causing piston 41 to move to the left and effecting quick advance of the tool to the work piece. At the completion of quick advance, the solenoid of valve 57 is de-energized so that the upper chamber 62 of valve 57 is connected to line 44 and air under pressure is directed into the right hand end of cylinder 16 to cause piston 46 and plunger 47 to move to the left causing feed of the tool. At the same time, three-way valve 51 is turned one-quarter turn counter-clockwise to connect line 32 with line 53 so that the fluid discharged from the right hand end of cylinder 13 is directed through needle valve 54 to prevent rapid feed. At the end of the feed stroke, both of the solenoid valves 56 and 57 are de-energized to cause return of the pistons and quill to the initial or disengaged position shown in the drawing.

When the solenoids are de-energized, the air line 42 of quick advance cylinder 14 is connected to an exhaust line 64, and the air line 44 of feed cylinder 16 is connected to the upper chamber 62 of valve 57 and through line 61 to exhaust line 62' so that, as the pistons are returned to released position, air in cylinders 14 and 16 is exhausted.

The machine described above and illustrated in the drawing is subject to structural modification without departing from the spirit and scope of the appended claim.

Having described my invention, what I claim as new and desire to protect by Letters Patent is:

A tool-advancing mechanism for a drill press or the like which comprises a quill, a cylinder surrounding said quill, a piston carried by said quill and reciprocable in said cylinder, a first drive cylinder having a piston therein for discharging hydraulic fluid therefrom, a second drive cylinder, said second drive cylinder having a main bore and a bore of reduced diameter, a main piston reciprocable in said main bore, a plunger attached to the main piston to reciprocate in the bore of reduced diameter for discharging hydraulic fluid from the bore of reduced diameter, a conduit connecting the fluid discharge of the first drive cylinder with the bore of reduced diameter of the second drive cylinder, a conduit connecting the fluid discharge of the reduced bore with one end of the quill cylinder, whereby fluid discharged by the drive cylinders advances the quill, a return conduit connected to the other end of the quill cylinder, valve means for closing the conduit between the drive cylinders when the plunger is advanced, a return cylinder connected to the return conduit, a return piston in said return cylinder, an air line connected to each of the drive cylinders and the return cylinder on the side of the piston thereof remote from the aforementioned conduits, a source of air under pressure, a first control valve, said first control valve having two chambers, said first control valve having two positions, means for connecting the source of air under pressure to one of said chambers, an air exhaust connected to the other of said chambers, means for connecting the air line of the return cylinder to the pressure chamber of the first control valve when the first control valve is in one position and with the exhaust chamber when the first control valve is in the other of its positions, a second control valve, said second control valve having two chambers and two positions, an exhaust line connected to one of the chambers of the second control valve, a conduit connected to the other of the chambers of the second control valve, means for connecting the last mentioned conduit to the exhaust chamber of the first control valve when in its first position, and to the pressure chamber of the first control valve when in its other position, means for connecting the air line of the first drive cylinder to the exhaust chamber of the second control valve when the second control valve is in one of its positions and to the other chamber of the second control valve when the second control valve is in the other of its positions, and means for connecting the air line of the second drive cylinder to the exhaust chamber of the second control valve when the second control valve is in its other position, and to the other chamber of the second control valve when the second control valve is in the first of its positions, whereby, when both control valves are in their first position, compressed air drives the piston of the return cylinder and the drive cylinders are connected to the exhaust and the quill is moved in return direction, when both control valves are in their second position, the air line of the return cylinder is connected to exhaust and air under pressure acts on the piston of the first drive cylinder to advance the quill at a rapid rate for quick advance, and when the first control valve is in its second position, and the second control valve is in its first position, air under pressure acts on the main piston of the second drive cylinder to advance the plunger for advancing the quill during tool feed.

References Cited in the file of this patent

UNITED STATES PATENTS

| | | |
|---|---|---|
| 706,688 | Reynders et al. | Aug. 12, 1902 |
| 791,075 | Carpenter | May 30, 1905 |
| 2,032,185 | Sciaky | Feb. 25, 1936 |
| 2,580,353 | Hunt | Dec. 25, 1951 |
| 2,612,756 | Peterson et al. | Oct. 7, 1952 |